United States Patent
Glorioso

(10) Patent No.: US 7,291,234 B2
(45) Date of Patent: Nov. 6, 2007

(54) CONTINUOUS FEED SYSTEM FOR PRODUCING STRUCTURAL INSULATED PANELS

(75) Inventor: Sammie J. Glorioso, Ridgeland, MS (US)

(73) Assignee: IP Rights, LLC, Birmingham, AL (US)

( * ) Notice: Subject to any disclaimer, the term of this patent is extended or adjusted under 35 U.S.C. 154(b) by 757 days.

(21) Appl. No.: 10/632,391

(22) Filed: Jul. 31, 2003

(65) Prior Publication Data

US 2004/0022941 A1 Feb. 5, 2004

Related U.S. Application Data

(63) Continuation-in-part of application No. PCT/US02/28838, filed on Sep. 11, 2002.

(60) Provisional application No. 60/318,699, filed on Sep. 12, 2001.

(51) Int. Cl.
*B29C 65/54* (2006.01)
*B32B 5/20* (2006.01)

(52) U.S. Cl. .................... 156/78; 264/46.5
(58) Field of Classification Search ............ 156/78, 156/79, 244.22, 267; 264/46.5; 425/4 R, 425/4 C, 817 R, 817 C
See application file for complete search history.

(56) References Cited

U.S. PATENT DOCUMENTS 3,915,773 A * 10/1975 Bengtson .................. 156/79
4,043,719 A * 8/1977 Jones ...................... 425/115
4,602,466 A * 7/1986 Larson ................... 52/309.11
4,642,153 A 2/1987 Lohr
4,764,420 A 8/1988 Gluck et al.
5,194,323 A * 3/1993 Savoy ................... 428/305.5
6,093,481 A 7/2000 Lynn et al.
6,191,057 B1 2/2001 Patel et al.
RE37,095 E * 3/2001 Glorioso et al. ........... 521/79
6,228,312 B1 5/2001 Boyce
6,309,985 B1 10/2001 Virnelson et al.
2002/0136888 A1* 9/2002 Porter ................... 428/319.1
2004/0022941 A1 2/2004 Glorioso

FOREIGN PATENT DOCUMENTS

WO 0172863 10/2001

OTHER PUBLICATIONS

Structural Insulated Panel Association, Structural Insulated Panels-Strength and Energy Performance Properties of Foam-Core Sandwich Panels, pp. 1-2, 4, date unknown.

* cited by examiner

Primary Examiner—Jeff H. Aftergut
Assistant Examiner—Michael A Tolin
(74) Attorney, Agent, or Firm—Volpe & Koenig PC

(57) ABSTRACT

An apparatus and a continuous process produce composite structural insulated panels (SIPs). Lower boards are placed on a conveying system through a foam application zone and then upper boards are applied. The foam material adheres to the upper and lower boards to form a structural insulated panel after passing through a curing apparatus.

19 Claims, 5 Drawing Sheets

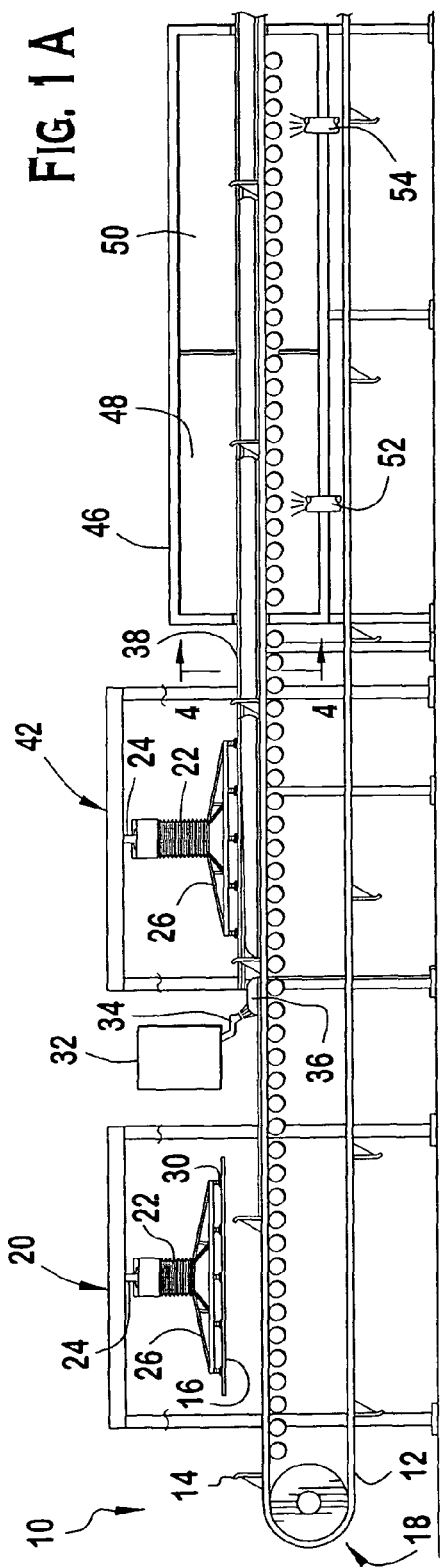
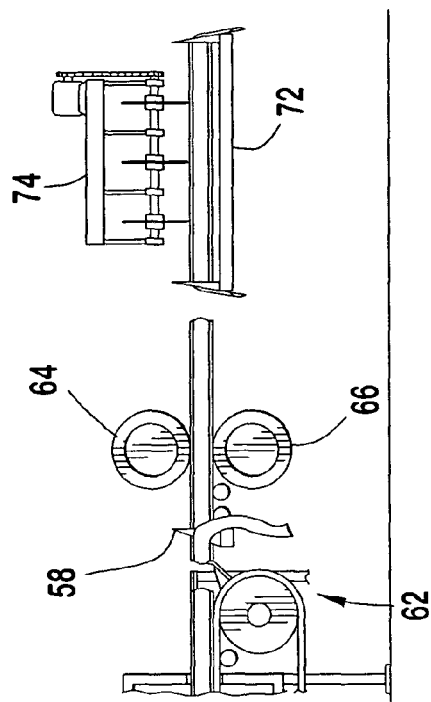

CONTINUOUS FEED SYSTEM FOR PRODUCING STRUCTURAL INSULATED PANELS

CROSS REFERENCE TO RELATED APPLICATIONS

This application is a continuation-in-part of International Application No. PCT/US02/28838, filed Sep. 11, 2002, which in turn claims priority from U.S. Provisional Application No. 60/318,699, filed Sep. 12, 2001, which are incorporated by reference as if fully set forth.

FIELD OF INVENTION

The present invention relates generally to methods of producing structural insulated panels (SIPs), and more particularly to a continuous process and apparatus for producing structural insulated panels.

BACKGROUND

Structural insulated panels (SIPs) are well known in the art. Common to all SIPs is an insulating core surrounded by two exterior members. SIPs have gained increased acceptance in building construction as an energy efficient and structurally sound alternative to drywall and fiberglass insulation. It is desirable to mass produce homogenous SIPs using a continuous process.

SUMMARY

An apparatus and continuous processing method for mass-producing homogenous SIPs is described herein. A lower board is placed on a conveyor. The board is conveyed through a foam application system that applies foam to the board. With the foam applied, an upper board is placed onto the foam and the board and foam composite transported through a curing apparatus. This cured lower board, foam, and upper board forms the structural insulated panel.

In a preferred manufacturing process, lower boards are sequentially transported via a conveying system through an application zone where a catalyzed foam mixture is applied to one face of each successive lower board. Upper boards are sequentially deposited over the catalyzed foam mixture as it expands while the lower boards are transported from the application zone via the conveying system. The lower boards, expanding foam mixture, and upper boards continuing on the conveying system through a curing apparatus such that structural insulated panels are formed having a foam core of a selected thickness that is adhered to upper and lower boards.

A preferred apparatus includes a conveyor for sequentially transporting lower boards through an application zone where a catalyzed foam mixture is applied to one face of each successive lower board and subsequently through a curing apparatus. A lower board placement device sequentially places lower boards onto the conveyor in advance of the application zone. A foam application system applies the catalyzed foam mixture to lower boards as they are conveyed through the application zone. An upper board placement device sequentially places upper boards over the catalyzed foam mixture as it expands while the lower boards are transported from the application zone to the curing apparatus. Preferably, the curing apparatus is configured to cure expanding catalyzed foam mixture disposed between lower boards and upper boards being transported by the conveyor such that structural insulated panels are formed having a foam core of a selected thickness that is adhered to upper and lower boards.

Other objects and advantages of the present invention will be apparent to those skilled in the art when read in conjunction with the following detailed description and appended drawings.

BRIEF DESCRIPTION OF THE DRAWINGS

FIG. 1A is a side view of a continuous feed system that is used to manufacture a composite structural insulated panel.

FIG. 1B is a schematic view of a terminal end of the feed system.

DETAILED DESCRIPTION OF THE PREFERRED EMBODIMENT(S)

Figure 2:
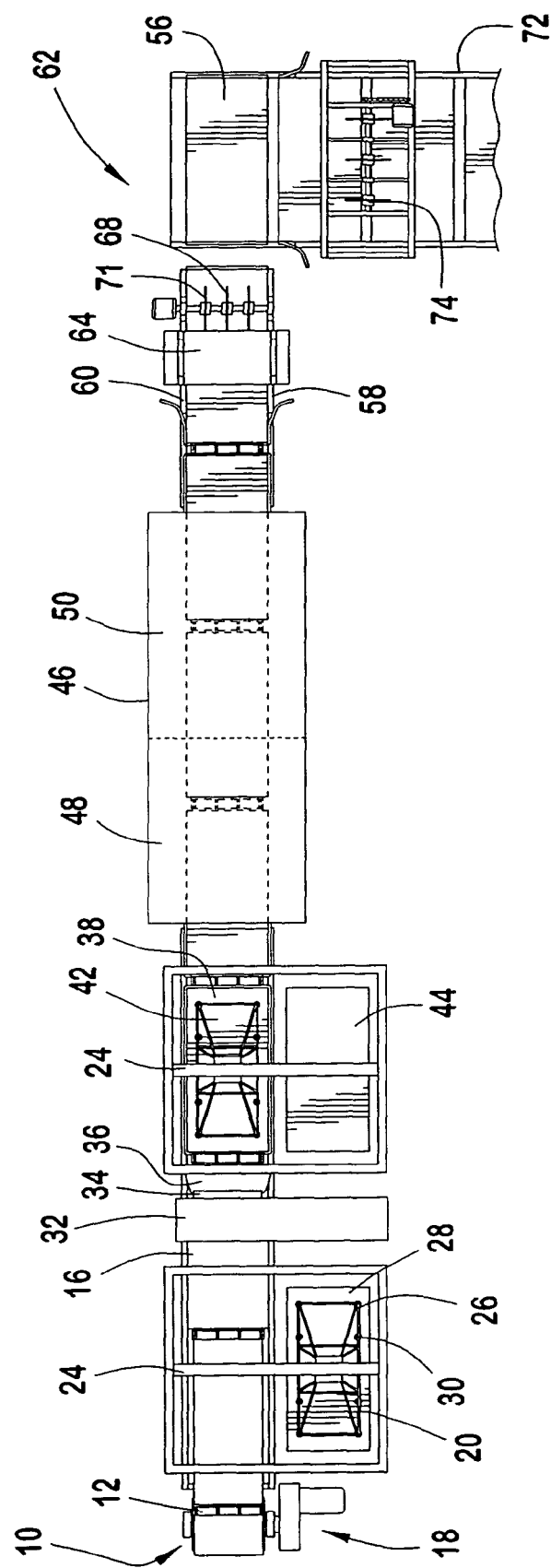
FIG. 2 is an overhead view of the feed system.

The apparatus and method described herein mass-produces homogenous structural insulated panels (SIPs). SIPs generally comprise an inner foam core surrounded by upper and lower boards. The upper and lower boards of the SIPs can be made of the same or different materials. The boards are preferably composed of oriented strand board (OSB), however, wafer board, plywood, gypsum board, or any other suitable material can be used. The boards may be textured or even have roofing shingles or exterior siding applied thereon.

The inner foam core of the SIP is preferably composed of a polyurethane or polyisocyanurate (PUR/PIR) foam core material. The foam core usually has a density in the range of 1.9 to 5.0 pounds per cubic foot (ppf) (30.4-80.1 kilograms per meter cubed), and preferably in the range of 1.9 to 2.1 ppf (30.4-33.6 kilograms per meter cubed).

The equipment is preferably sized to produce SIPs in standard sizes of four feet by eight feet (1.2 meters×2.4 meters) up to eight feet by twenty four feet (2.4 meters×7.3 meters). The foam core is preferably three to four inches thick (76.2 mm to 101.6 mm) and the boards are preferably 7/16 inches (11.11 mm) thick, however, any desired thickness can be used.

Figure 3:
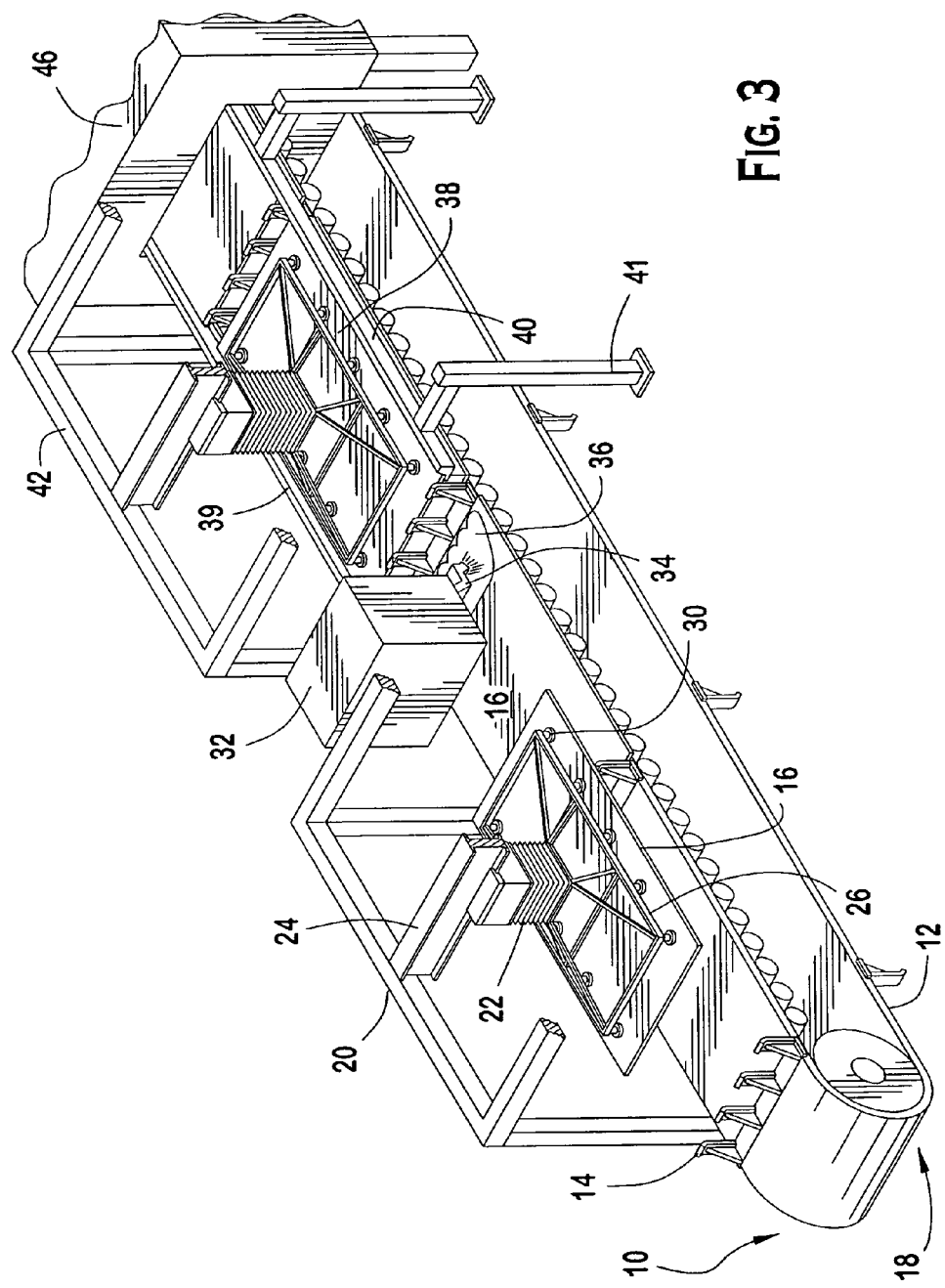
FIG. 3 is a perspective view of the feed system.

With reference to FIGS. 1-3, a continuous feed system 10 is shown that manufactures the composite structural insulated panels. A conveyor 12 continuously moves through the system 10 during operation. The conveyor (shown as a belt in the Figures) preferably moves at rate of from 20 to 60 ft./min. The conveyor belt 12 is shown with buttresses 14 equally spaced along its entire length. The buttresses 14 separate and provide a positive drive to sequential lower boards as the SIPs are formed on the conveyor 10.

Lower boards 16 are placed directly on the conveyor belt 12 at the origin end 18 of the system 10 either manually or automatically by using a lower board placement device 20. The lower board placement device 20 preferably has axially extendible shaft 22 connected to a lateral support 24 on one end and a board attachment means 26 on the other. When the shaft 22 extends, the placement device 20 moves downward toward the conveyor; when the shaft 22 contracts, the device 20 is drawn upwards and away from the conveyor.

The placement device 20 also moves laterally to the conveyor 12 when it retrieves a lower board 16 from a board stack 28 and moves said board to the conveyor. This lateral movement is made possible by a lateral support 24 that supports the extendible shaft 22 and attachment means 26. In operation, the attachment means 26 preferably attaches to an exposed lower board 16 in a stack of lower boards 28 (as seen in FIG. 2). The preferred attachment means 26 attaches to an exposed lower board 16 using one or more suction units 30 although any means of attaching to the exposed lower board 16 can be used. The placement device 20 then positions the attached lower board 16 directly on the conveyor belt 12 between a set of spacers 14. Once the lower board 16 is placed on the conveyor belt 12, the placement device 20 releases the board 16.

The manufacturing system 10 includes a foam mixing and application device 32 that selectively mixes the foam ingredients and applies the mixture to the lower boards during the manufacturing process. After being placed on the conveyor belt 12, the lower boards 16 pass under the foam application device 32. The foam application device 32 is preferably an extruder 32 having an extruder head 34 in which a catalyst is mixed with the other mixed ingredients and deposits a PUR/PIR foam material catalyzed mixture 36 at a selectively controlled rate in a selectively sized application zone. Accordingly, as the lower boards 16 are conveyed through the application zone, the catalyzed mixture is deposited directly on the lower boards 16. The PUR/PIR foam catalyzed mixture 36 expands while the conveyor continues to move the lower boards toward the upper board placement device 42.

The upper boards 38 can be manually or automatically placed on the feed system using a second upper board placement device 42, which operates as described above with respect to the first placement device. The placement device 42 attaches to an exposed upper board 38 in a set of stacked upper boards 44. The placement device 42 then places the upper board 38 on and between supporting guide rails 39, 40, preferably, directly over a lower board 16 having the expanding foam material 36 applied thereto.

Figure 4:
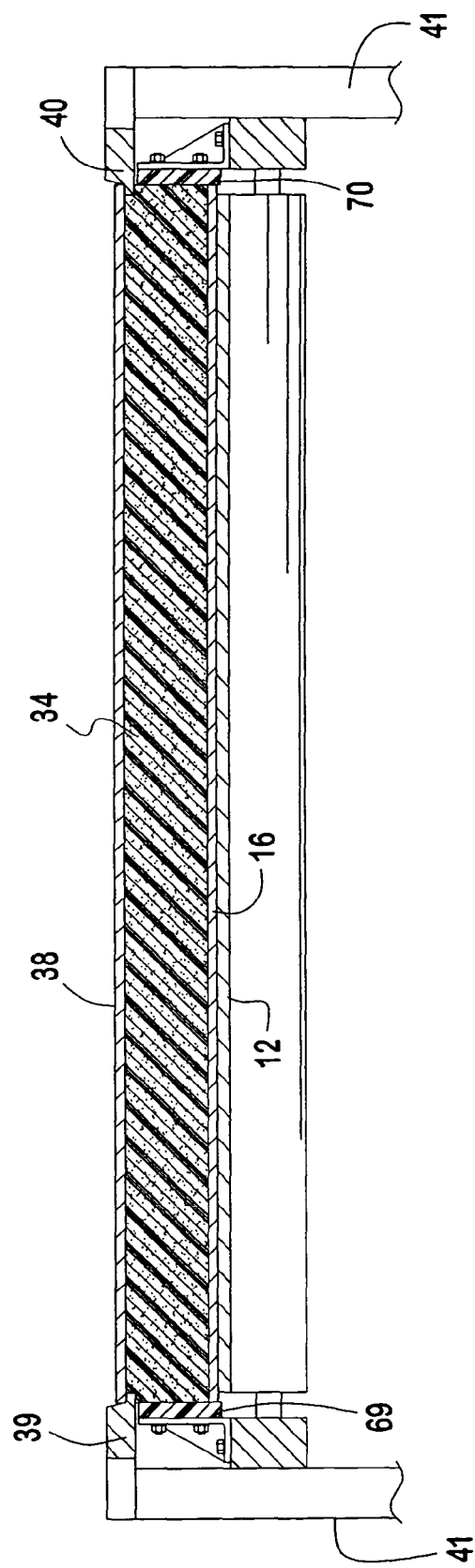
FIG. 4 is a partial cross-sectional of the feed system of FIG. 1A as taken along the line 4-4 of FIG. 1A.

As shown in FIGS. 3 and 4, supporting guide rails 39, 40 are preferably used to keep the upper boards 38 spaced a desired height above the lower boards 16 to maintain a desired product thickness as the foam material fully expands. The guide rails 39, 40 are held in place by buttresses 41 spaced along the length of the support rails 39, 40. The guide rails 39, 40 are preferably designed to create a 3 to 4 inch thick foam core 36, although any desired thickness can be achieved.

One alternative to the fixed guide rails 39, 40 is to use moveable spacer guides that are applied to the product edges which travel with the boards through the curing station 46 and are thereafter stripped. Also, where relatively wide SIPs are being produce and/or depending upon the rigidity of the boards 16, 38, it is often desirable to introduce one or more center spacers to maintain a uniform thickness across the products width. To accommodate center spacers, the foam application head may be configured to apply a split stream of catalyzed mixture 36 that is applied on opposing sides of the center of the lower boards so that the foam expands to surround the spacers.

With an upper board 38 in place, the conveyor 12 continue to transport the SIP being formed through the manufacturing system 10 into a curing zone preferably defined by a curing apparatus 46. The curing apparatus 46 cures the expanded foam material 36 and enhances bonding between the foam 36 and boards 16, 38. The curing apparatus 46 preferably has heating and cooling sections 48 and 50 that circulate air through heating and cooling vents 52, 54. After traveling completely through the curing zone, a composite structural insulated panel 56 has been formed that exits the curing apparatus 46 for finishing.

As shown in FIGS. 1B and 2, side foam cutters 58, 60 are positioned on both sides of a terminal end 62 of the manufacturing apparatus 10 to cut off side excess foam material. The panels 56 preferably move past the side foam cutter 58, 60 as they leave the conveyor 12, engaging pull rolls 64, 66 as illustrated in FIG. 1B. The side foam cutters 58, 60 shown are a razor type, although any means for cutting the excess foam material can be used. To prevent the formation of side excess foam material, side walls 69, 70 as shown in FIG. 4 can be positioned along the length of the support rails 39, 40. However, care must be taken to assure that sufficient foam material is deposited on the lower boards 16 in the application zone so that the expanded foam completely fills the space between the upper and lower boards 16, 38 with out causing undesirable product expansion beyond the desired product thickness.

The manufactured panels 56 can be made several times larger than a desired finished size. In such case, a supplementary cutting system is provided. Preferably, the manufactured panels 56 are cut along their length using a first panel cutter 68 positioned at the end 62 of the manufacturing apparatus. The panel cutter 68 has one or more circular saws 71 for cutting the panels 56. A second conveyor 72 is used to transport the panels 56 or cut portions thereof through a second panel cutter 74 to cut the panel 56 across its width. One or both cutters can be operated to cut the manufactured panels 56 depending upon the desired size and shape of the finished product. The saw dust and scraps may be collected and used as filler material as discussed below with respect to the foam ingredients and formulation.

Figure 5:
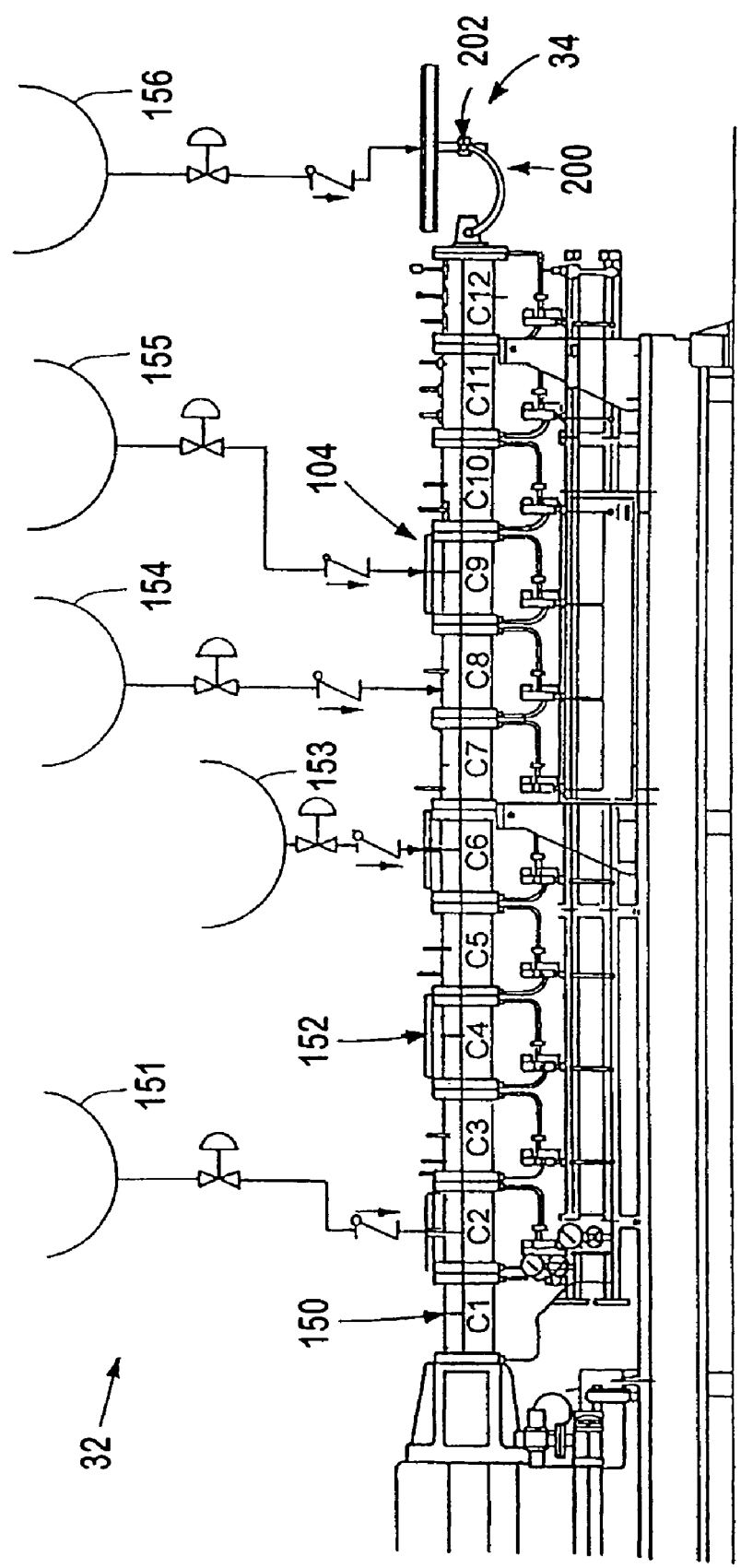
FIG. 5 is a side view of a foam mixing system.

A preferred foam mixing system is the extruder system 32 illustrated in FIG. 5. The preferred extruder system 32 includes a twelve-barrel extruder 104 and reservoir system for introducing the foam ingredients into the extruder barrels C1-C12 during the foam making process. In addition to reservoirs 151, 153, 154, 155, and 156 for the introduction of fluid material, the extruder 104 includes feed ports 150 and 152 where granular material and solids may be conveniently added and mixed in the screw of the extruder as explained in detail in U.S. Pat. RE 37,095. Conventionally, the reservoirs 151, 153, 154, 155, and 156 are maintained on site with the extruder in the foam manufacturing area.

In manufacturing foam using the preferred extrusion system 32 of FIG. 5, filler material such as glass fibers and/or microspheres may be provided to the extruder system 102 at barrels C1 and C4 from hoppers 150 and 152. A mixture of isocyanate and optionally surfactant is preferably fed to the extruder 104 at barrel C2 from reservoir 151. An additional mixture of isocyanate and optionally surfactant may also be added to the extruder 104 at barrel C6 from reservoir 153. A foaming agent (blowing agent) such as isopentane, n-pentane, cyclopentane, other hydrocarbons, hydrochlorofluorocarbons (HCFC), hydrofluorocarbons (HFC) or any combination thereof is provided to the extruder 104 at barrel C8 from reservoir 154. Polyol, a foaming agent, such as pentane, HCFC, or HFC, and surfactant are preferably fed to the extruder 104 at barrel C9 from reservoir 155. If water is utilized as the foaming/blowing agent precursor, it may be mixed with the polyol in reservoir 155, thereby producing $CO_2$ when it mixes with the isocyanate. Alternatively, water and liquid $CO_2$ may be utilized. The mixture of the component parts of the filler, isocyanate, polyol, and additional agents, without the catalyst, arrives via a hose 200 to entry port 202 of the extruder head 34. Finally, a catalyst or catalyst mixture, such as an amine and potassium octoate is provided to the extruder head 34 from reservoir 156. The extruded mixture of PUR/PIR foam ingredients exits the extruder head 34 and is deposited on the lower boards 16 where it foams, firms and cures during the process as discussed above in conjunction with FIGS. 1-3.

EXAMPLES

A preferred formulation for the PUR/PIR foam include the following ingredients identified as parts per weight:

TABLE 1

| Polyester or Polyether Polyol | 408 |
|---|---|
| Surfactant | 8.2 |
| Blowing Agent | 6-45 |
| Glass or Polymeric Microspheres | 0-180 |
| Catalyst | 14.2 |
| Isocyanate | 400-650 |

Composite structural insulated panels made using the process described above and having a thickness of 3⅞ inches (98.4 mm) were strength tested. The exterior boards were 8 feet (2.4 meters) wide by 8 feet (2.4 meters) long and made of 7/16 inch (11.1 mm) thick oriented strand board. The foam core had a thickness of 3 inches (76.2 mm) and a density of 2.0 pcf (32.04 kg/m$^3$) and was produced as described above in Table 1. Table 2 illustrates the racking shear load strength of three samples.

TABLE 2

| Panel | Shear Load at 0.5-inch Deflection (lbs.) | Ultimate Load (lbs.) |
|---|---|---|
| 1 | 2,604 | 3,319 |
| 2 | 2,446 | 3,201 |
| 3 | 2,741 | 3,157 |
| Average | 2,597 | 3,226 |

While particular embodiments of the present invention have been shown and described above, it will be obvious to those skilled in the relevant arts that changes and modifications may be made without departing from the scope of the present invention. It is understood, therefore, that this invention is not limited to the particular embodiments disclosed, but is intended to cover all modifications which are within the spirit and scope of this invention as defined by the appended claims and/or shown in the attached drawings.

What is claimed is:

1. A process for manufacturing composite structural insulated panels comprising:
sequentially depositing lower boards on a conveyor of a conveying system between a pair buttresses that extend away from the conveyor and transporting the lower boards via the conveying system through an application zone wherein a multi-barrel extruder system mixes and applies a catalyzed foam mixture to one face of each successive lower board, the catalyzed foam mixture expanding upon application on the lower boards;
sequentially depositing upper boards on a pair of stationary support rails at a desired height above the conveyor, the buttresses positively driving the upper boards alone the pair of stationary support rails at a complementary position over the respective lower boards and expanding catalyzed foam mixture;
continuing to transport the lower boards, expanding foam mixture, and upper boards via the conveying system through a curing apparatus such that structural insulated panels are formed having a foam core of a selected thickness that is adhered to upper and lower boards.

2. The process of claim 1, wherein a lower board placement device is used to position the lower boards on the conveyor.

3. The process of claim 2 wherein an upper board placement device is used to sequentially deposit upper boards on the catalyzed foam mixture as it expands while the lower boards are transported from the application zone via the conveying system.

4. The process of claim 1, wherein upper and lower boards selected from the group comprising oriented strand board, gypsum board, plywood, waferboard, or any combination thereof are sequentially transported and sequentially deposited, respectively.

5. The process of claim 1, wherein upper and lower boards having a thickness of 7/16 inch (11.1 mm) are sequentially transported and sequentially deposited, respectively.

6. The process of claim 1, wherein a catalyzed foam mixture to form a polyurethane or polyisocyanurate foam is applied to one face of each successive lower board.

7. The process of claim 2 wherein the conveyor transports the lower boards through the foam application zone.

8. The process of claim 3 wherein the conveyor transports the lower boards through the foam application zone and the conveyor transports the lower boards with the catalyzed foam mixture applied thereon through the upper board placement device.

9. The process of claim 8 wherein the conveyor transports the lower boards with the catalyzed foam mixture applied thereon and the upper boards deposited thereon through the curing apparatus.

10. The process of claim 9 wherein the conveyor moves continuously at a rate of 20 to 60 ft./min.

11. The process of claim 10 wherein a catalyst is mixed with other foam making ingredients as a last mixing step before depositing the catalyzed foam mixture onto the lower boards.

12. The process of claim 1 wherein continuing to transport the lower boards, expanding foam mixture, and upper boards via the conveying system through a curing apparatus comprises transport through heating and cooling sections of the conveying apparatus.

13. The process of claim 1 further comprising trimming the structural insulated panels and cutting them into pieces of a desired size.

14. The process of claim 1, wherein the multi-barrel extruder system has a single dispensing head for depositing the catalyzed foaming mixture on the lower boards.

15. The process of claim 1, wherein each barrel of the multi-barrel extruder system has an associated reservoir for introducing foam ingredients into the extruder barrels.

16. The process of claim 15, wherein the foam mixture further comprises isocyanate, polyol, foaming agent, and catalyst.

17. The process of claim 16, wherein the catalyst is provided from an associated reservoir to a dispensing head.

18. A process for manufacturing composite structural insulated panels, each structural insulated panel having an upper board, a lower board, and a foam mixture therebetween, the process comprising:
sequentially depositing lower boards on a conveyor of a conveying system and transporting the lower boards via the conveying system through an application zone wherein a catalyzed foam mixture is applied to one face of each successive lower board;

the catalyzed foam mixture expanding upon application on the lower boards;

the conveying system comprising a pair of stationary support rails to keep the upper boards at a desired height and placement above the respective lower boards;

sequentially depositing the upper boards on the pair of stationary support rails of the conveying system at a complementary position over the lower boards and the expanding foam mixture as the lower boards are transported from the application zone of the conveying system; and continuing to transport the lower boards, expanding foam mixture, and upper boards via the conveying system through a curing apparatus such that structural insulated panels are formed having a foam core of a selected thickness that is adhered to upper and lower boards.

19. The process of claim 18, wherein the lower boards are deposited on the conveying system between a pair of buttresses that extend away from the conveyor, and the buttresses positively drive the upper boards along the pair of stationary support rails at a complementary position over the respective lower boards and catalyzed foam mixture.

* * * * *